United States Patent
Källberg et al.

[11] Patent Number: 5,971,010
[45] Date of Patent: Oct. 26, 1999

[54] SHAFT DEVICE AND A METHOD OF COOLING A SHAFT DEVICE

[75] Inventors: Lars Källberg, Finspång; Frank Schliephacke, Norrköping, both of Sweden

[73] Assignee: ABB Carbon AB, Finspang, Sweden

[21] Appl. No.: 08/983,257

[22] PCT Filed: Jun. 20, 1996

[86] PCT No.: PCT/SE96/00812

§ 371 Date: Apr. 2, 1998

§ 102(e) Date: Apr. 2, 1998

[87] PCT Pub. No.: WO97/02436

PCT Pub. Date: Jan. 23, 1997

[30] Foreign Application Priority Data

Jul. 6, 1995 [SE] Sweden .................................. 9502462

[51] Int. Cl.⁶ .................................................. F16K 31/44
[52] U.S. Cl. ........................... 137/340; 137/338; 251/214
[58] Field of Search .......................... 251/214; 137/338, 137/340

[56] References Cited

U.S. PATENT DOCUMENTS 3,643,024  2/1972  La Coste et al. ........................ 137/340
4,022,424  5/1977  Davis et al. ............................. 251/214

FOREIGN PATENT DOCUMENTS

| 453225 | of 1927 | Germany . |
| 26 38 602 | of 1979 | Germany . |
| 117180 | of 1946 | Sweden . |
| 139007 | 2/1953 | Sweden ................................. 137/338 |
| 437 060 | of 1985 | Sweden . |
| 2 121 118 | of 1983 | United Kingdom . |

OTHER PUBLICATIONS

Sony K.K., Mikio Kudoui, Ball and Roller Bearings, Patent Abstract of Japan, vol. 7, No. 63, M–200. 57–208319 (A), Appl. No. 56–94501.

*Primary Examiner*—A. Michael Chambers
*Attorney, Agent, or Firm*—Pollock, Vande Sande & Amernick

[57] ABSTRACT

A shaft device for a valve, comprises a shaft supported in a bearing and extending into a relatively warm space, a sleeve provided between the shaft and the bearing, and cooling channels arranged in the border area between the shaft and the sleeve for cooling of the bearing, and wherein the axial length of the sleeve is longer than the axial length of the bearing.

14 Claims, 3 Drawing Sheets

SHAFT DEVICE AND A METHOD OF COOLING A SHAFT DEVICE

THE FIELD OF THE INVENTION

The present invention relates to a shaft device comprising a shaft supported by a support member and extending into a relatively warm space. The invention further relates to a method of cooling a shaft device which comprises a shaft supported by a support member and extending between a relatively warm space and a relatively cool space.

BACKGROUND OF THE INVENTION

In a pressurized bed combustion power plant, a so called PFBC-power plant, the hot combustioned gases are guided from the fluidized bed combuster through cyclones, for purification, in a hot gas channel, to a gas turbine. The shaft of the gas turbine drives a compressor, compressing the combustion air which, through an air supply channel, is supplied to the fluidized bed combuster. The hot gas channel is arranged concentrically in the air supply channel and, accordingly, the hot gas channel is surrounded by the air which is supplied to the combuster. To be able to shut off the flow of hot gas to the gas turbine, for instance in case of a gas turbine trip, a throttle valve is arranged in the proximity of the hot gas channel inlet to the gas turbine. This throttle valve is arranged on a shaft which is turnably supported by means of bearings arranged in the wall of the hot gas channel. Due to the high temperature, approximately 850°–870° C., existing in the hot gas channel, damages often occur on the shaft bearings, as heat is led through the shaft of the throttle valve into the bearings. This can lead to that the throttle valve does not work when the gas turbine has to a problem be quickly stopped.

SUMMARY OF THE INVENTION

The object of the present invention is, in connection with a shaft which is subjected to high temperatures, to accomplish an effective cooling of the support member which supports the shaft and may comprise temperature sensitive components, such as bearings, sealings or the like. This object is obtained by the shaft device, characterized in that channels are arranged in the border area between the shaft and the support member for cooling the support member. By means of such channels it is possible to cool the support member and to prevent heat from the warm space from being transferred into the support member via the shaft. Thus, by means of the present invention, all functions of the support member can be assured.

According to a preferred embodiment, means are arranged for generating a flow through the channels. Such means may, for instance, comprise a pump which pumps a fluid or a gas through the channels. However, these means may also comprise the mere use of a pressure difference between the inlets and outlets of the channels.

According to one embodiment the channels extend helically in relation to the longitudinal direction of the shaft. In that way, the length of the channels may be increased, and thereby also the flow resistance increases, which is important for making use of the heat absorbing ability of a medium which is led through the channels. A required cooling effect may be obtained by optimizing the patch angle of the helical channels, the number of channels and the cross sectional area of the channels.

According to another embodiment, the channels extend rectilinearly generally in the longitudinal direction of the shaft. Such a relatively simple design does not result in a cooling effect as important as for helical channels, but may be advantageous when, for instance, a cooling medium has a very low temperature.

According to a further embodiment, the channels located in the border area comprise grooves arranged on the shaft. Advantageously, a sleeve is arranged between the shaft and the support member. In that way the channels may be extended to comprise the whole length of the sleeve and are not restricted by the length of the support member, which results in a better cooling effect. Thereby, the channels will preferably be formed by the grooves in the shaft and the sleeve. Alternatively, the channels located in the border area may be formed by grooves arranged in the sleeve, and the shaft, or by grooves arranged in the sleeve, and the support member. According to a further embodiment, it is also possible for the channels located in the border area to comprise grooves arranged in the support member.

In one embodiment the support member comprises a bearing with a first bearing portion, a second bearing portion movable in relation to the first bearing portion, and a mounting piece connected to the second bearing portion, the shaft being movable in relation to the mounting piece. Thereby the channels located in the border area may advantageously be arranged between the shaft and the first bearing portion, or, alternatively, between the mounting piece and the second bearing portion.

According to a further embodiment, the channels may extend between and connect the relatively warm space and a relatively cool space. Thereby, the means may be arranged to accomplish the flow by means of a pressure difference between the cool and the warm space. The cool space may be formed by a pressurized enclosure, and the warm space by a hot gas channel, for instance from a combustion plant. Thereby, the flow generating means may comprise a combustion chamber which is arranged to accomplish a stream in the hot gas channel in order to drive a gas turbine which is connected to a compressor compressing the combustion air supplied through the pressurized enclosure. In this way relatively cool air will stream from the pressurized enclosure through the channels into the hot gas channel. This may, for instance, be accomplished by way of the pressurized enclosure enclosing the hot gas channel.

According to one embodiment, the shaft device also comprises a valve disc which is fixed to the shaft and turnable about the longitudinal direction of the shaft. Such a turnable valve disc may, advantageously, be provided in the hot gas channel and arranged to close the latter.

The object is also obtained by the method characterized in that a cooling flow is guided from the cool space to the warm space through channels arranged in the border area between the shaft and the support member.

BRIEF DESCRIPTION OF THE DRAWINGS

The present invention will now be described more an detail with reference to an embodiment shown in the accompanying drawings.

DETAILED DESCRIPTION OF THE PREFERRED EMBODIMENTS

Figure 1:
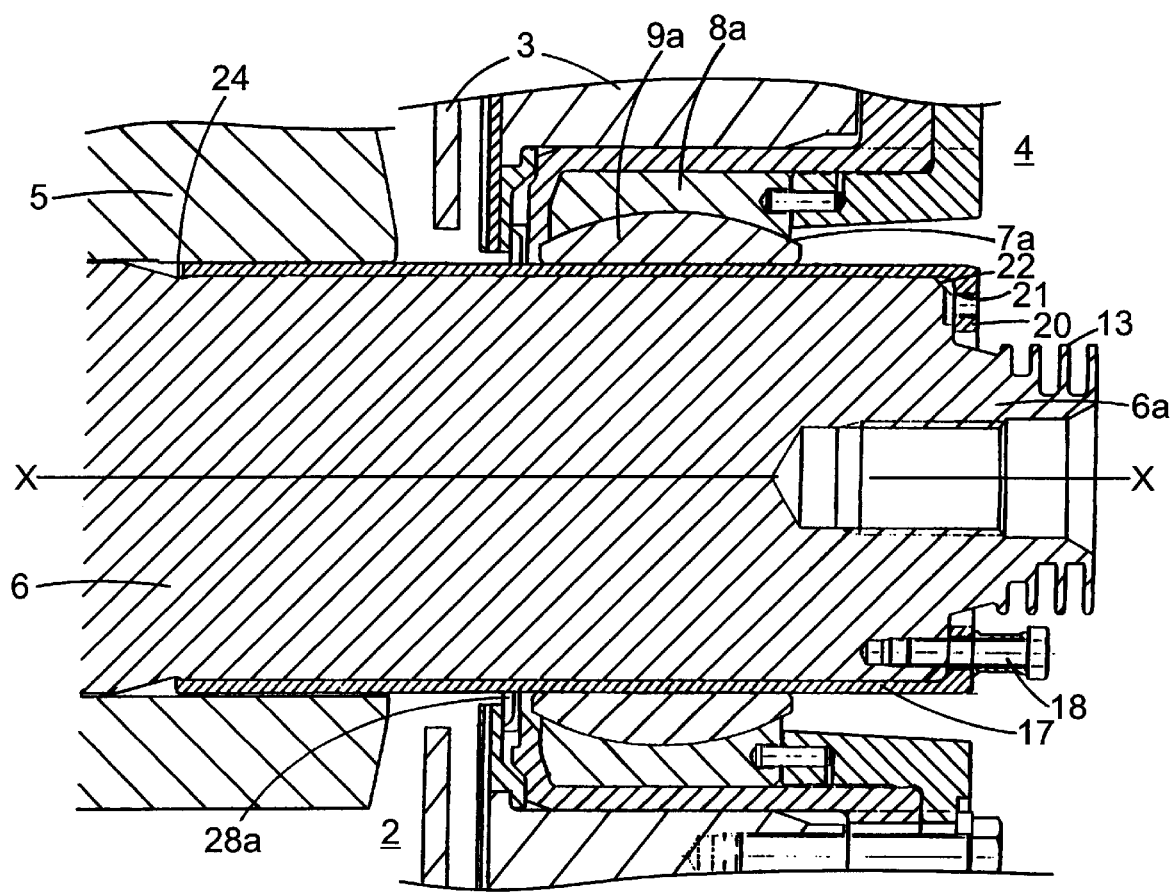
FIG. 1 shows, in a cross-sectional view a shaft with a first end that is supported by a first bearing.
Figure 2:
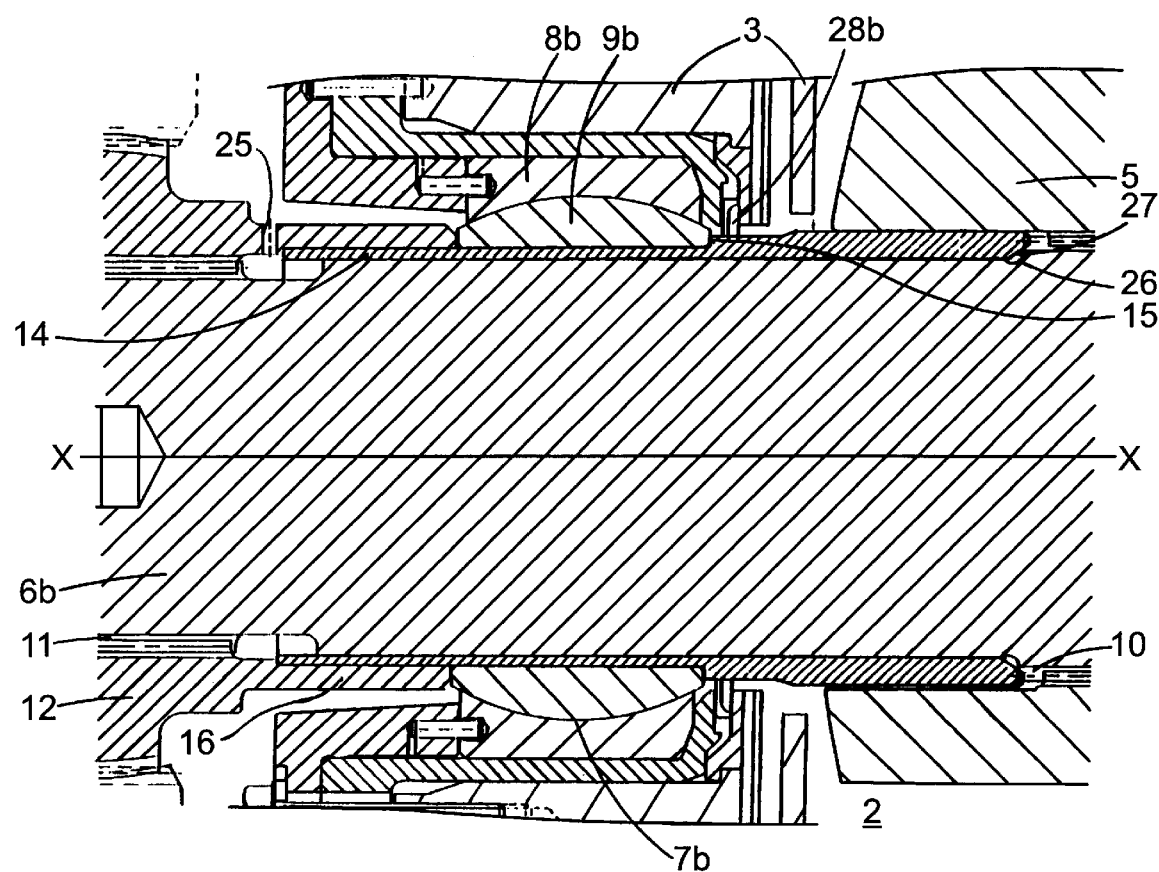
FIG. 2 shows, in a cross-sectional view, the second end of the shaft, which is supported by a second bearing.

FIGS. 1 and 2 show parts of a throttle valve 1 which is arranged in a hot gas channel 2 in which the hot combustion gases from a fluidized bed combuster, not shown, are conducted to a gas turbine, not shown. By means of the throttle valve 1 the flow through the heat gas channel 2 may be shut off. Normally, the hot gases have a temperature of approximately 850° C., but, at times, the temperature may rise to approximately 870° C. The hot gas channel 2 is delimited by a channel wall 3, outside of which a relatively cool combustion air flows in an air supply channel 4 surrounding the hot gas channel 2. The relatively cool air supplied has a temperature of approximately 300° C. The air is supplied through the air supply channel 4 by means of a compressor, not shown, driven by the gas turbine. Due to the fall of pressure in the fluidized bed combuster, cyclones etc. the pressure in the air supply channel 4 will be higher than in the hot gas channel 2.

The throttle valve 1 comprises a valve disc 5 and a valve shaft 6 with a longitudinal center axis X-X. The valve shaft 6 presents two shaft ends 6a, 6b which are each supported by a respective bearing 7a and 7b. The bearings 7a, 7b are comprised by spherical slide bearings with an outer ring 8a, 8b and an inner ring 9a, 9b. The outer rings 8a, 8b of the bearings 7a, 7b are firmly arranged in the channel wall 3. The valve shaft 6 further presents wedge grooves 10 by means of which it is assured that the valve disc 5 can not turn in relation to the valve shaft 6. Furthermore, the shaft end 6b presents wedge grooves 11 by means of which a gearing 12 is attached to the valve shaft 6 for a rotation of the latter. The second shaft end 6a presents flange-like members 13 for cooling the shaft end 6a. At the shaft end 6b a sleeve 14 is firmly arranged through shrinkage. The inner end of the sleeve 14 presents gear-like members which project axially inwardly and are engaged with the wedge grooves 10. The sleeve 14 further presents a shoulder 15 against which the inner ring 9b of the bearing 7b bears. The inner ring 9b is held against the shoulder 15 by means of an additional part 16 of the gearing 12, which part is pushed upon the sleeve 14 until it bears against the inner ring 9b. At the second shaft end 6a, a similar sleeve 17 is firmly arranged by shrinkage. Furthermore, the sleeve 17 is fixed upon the shaft end 6a by screws 18. The inner ring 9a of the bearing 7a is arranged on the sleeve 17 with a small spacing so that the valve shaft 6 may be slightly displaced in relation to the bearing 7a due to heat expansion.

Figure 3:
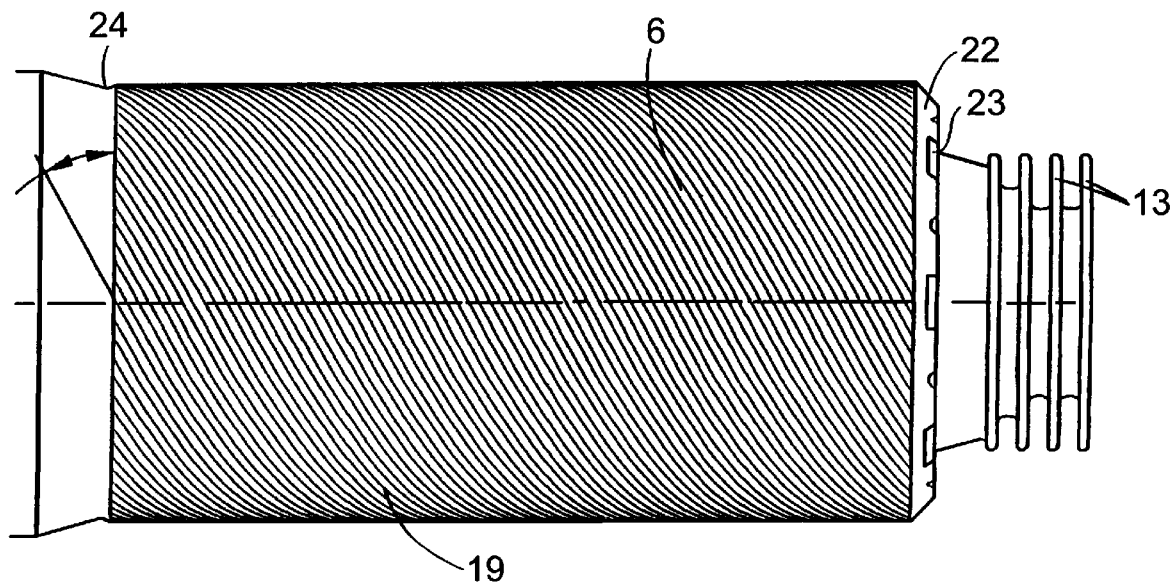
FIG. 3 shows the first shaft end.

The shaft ends 6a and 6b present grooves 19 which are shown detail with reference to FIG. 3, which shows the shaft end 6a. The grooves 19 follow a helical path with the pitch angle a on the outer peripheral surface of the shaft end 6a. The grooves 19 may be almost half circular in cross section and present a depth of approximately 1 mm. The grooves extend along the whole length of the sleeve 17 and, thus, together with the sleeve 17, form helical channels. The sleeve 17 presents an end side 20 into which holes 21 are made, partly for the screws 18, and partly for air access to the channels formed by the grooves 19. The shaft end 6a is provided with a bevel 22 so that a surrounding channel that around is formed between the bevel 22 and the sleeve 17 in a corner between the peripheral surface of the sleeve 17 and the end side 20 thereof. Furthermore, the shaft end 6a presents recesses 3 which are arranged opposite to the holes 21 for air access to the surrounding channel and the channels formed by the grooves and the sleeve 17. At the second end of the sleeve 17 the shaft end 6a is provided with a surrounding recess 24, to permit the exit of the air out from the channels formed between the grooves 19 and the sleeve 17. Also the second shaft end 6b is provided with similar grooves 19, which, together with the sleeve 14, form helical channels. Here, air access to these channels is assured by means of one or several openings 25 arranged through the additional part 16 of the gearing 12 and which are located axially outside the sleeve 14 and opposite to a portion of the shaft end 6b, which portion presents a slightly smaller diameter than the inner diameter of the sleeve 14. Thus, the air can enter through the openings 25, below the sleeve 14 and into the grooves 19. At the second end of the sleeve 14, the shaft end 6b is provided with a surrounding recess 26 through which the air located in the channels formed by the grooves 19 and the sleeve 14 may exit. Furthermore, the sleeve 14, arranged to permit the exit of the air, is provided with a bevel 27. Furthermore, there are sealing rings 28a and 28b which are arranged in the wall and sealingly abut the sleeves 14 and 17 respectively.

Due to the higher pressure in the air supply channel 4 than in the hot gas channel 2, relatively cool air will thus be brought from the air supply channel 4 through the channels formed by the grooves 19 and the respective sleeve 14 and 17 and into the hot gas channel 2. This relatively cool air thus contributes to an effective cooling of the shaft ends 6a and 6b, the bearings 7a and 7b and the sealings 28a and 28b. The relatively cool air, on its way through the channels, absorbs the heat led from the heat gas channel 2 through the valve shaft 6 and brings it back into the heat gas channel 2. The cooling effect of the channels may be optimized through selection of the number of grooves 19, the size of the grooves 19 and the pitch angle a of the helical grooves 19.

According to an alternative embodiment it is also possible to design the grooves rectilinearly and generally parallel to the longitudinal axis X-X of the valve shaft 6. To obtain sufficient flow resistance, such axial channels must, in this case, be relatively small.

As a further alternative it is also possible to design the grooves 19 at the inner peripheral surface of the sleeve 14, 17, so that the channels are formed by the sleeve 14, 17 and the shaft end 6b and 6a, respectively. Furthermore, it is possible to produce the valve shaft 6 without sleeves, whereby the channels will be formed by the grooves 19 arranged at the shaft ends 6a and 6b and the inner rings 9a and 9b of the bearings 7a, 7b. Also in this case it is possible to arrange the grooves at the inner rings 9a and 9b instead of on the shaft ends 6a, 6b. Furthermore, it is possible to arrange the channels at the shaft ends 6a, 6b just inside the outer peripheral surface, in which case no such sleeve would be necessary.

The shaft construction shown is not limited only to use or throttle valves in hot gas channels, but may be used for a plurality of other purposes. By all types of shafts with some type of bearing that permits either axial movement or rotational movements of the shaft, the shown cooling channels may be used to prevent heat from penetrating into the bearing via the shaft. The cooling channels shown may also be used to preventing heat from penetrating into a shaft sealing, which at many occasions are made of temperature sensitive materials.

We claim:

1. A shaft device for a valve, comprising a shaft supported in a bearing and extending into a relatively warm space, a sleeve provided between the shaft and the bearing and cooling channels arranged in the border area between the shaft and the sleeve for cooling of the bearing, and wherein the axial length of the sleeve is longer than the axial length of the bearing.

2. A shaft device according to claim 1, further comprising means are arranged for generating a flow through the cooling channels.

3. A shaft device according to claim 2, further comprising means for achieving the flow through a pressure difference between the cool and the warm space.

4. A shaft device according to claim 2, wherein the warm space is formed by a hot gas channel.

5. A shaft device according to claim 4 wherein the turnable valve disc is arranged in the hot gas channel and arranged to close the latter.

6. A shaft device according to claim 1, wherein the cooling channels extend helically in relation to the longitudinal direction (X-X) of the shaft.

7. A shaft device according to claim 1, wherein the cooling channels extend rectilinearly substantially in the longitudinal direction (X-X) of the shaft.

8. A shaft device according to claim 1, wherein the cooling channels located in the border area comprise grooves arranged on the shaft.

9. A shaft device according to claim 1, wherein the cooling channels located in the border area comprise grooves arranged in the sleeve.

10. A shaft device according to claim 1, wherein the bearing comprises a first bearing portion, a second bearing portion movable in relation to said first portion, and a mounting piece connected to the second bearing portion, the shaft being moveable in relation to the mounting piece.

11. A shaft device according to claim 1, wherein the cooling channels extend between and connect the relatively warm space and a relatively cool space.

12. A shaft device according to claim 11, wherein the cool space is formed by a pressurized enclosure.

13. A shaft device according to claim 3, wherein the pressurized enclosure encloses the hot gas channel.

14. A shaft device according to claim 1, further comprising a valve disc fixed to the shaft and turnable around the longitudinal direction (X-X) of the shaft.

* * * * *